US012598312B2

(12) United States Patent
Giladi et al.

(10) Patent No.: US 12,598,312 B2
(45) Date of Patent: *Apr. 7, 2026

(54) OVERHEAD REDUCTION IN MEDIA STORAGE AND TRANSMISSION

(71) Applicant: Comcast Cable Communications, LLC, Philadelphia, PA (US)

(72) Inventors: Alexander Giladi, Denver, CO (US); Weidong Mao, West Windsor, NJ (US); Blake Orth, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/886,857

(22) Filed: Sep. 16, 2024

(65) Prior Publication Data

US 2025/0008118 A1 Jan. 2, 2025

Related U.S. Application Data

(63) Continuation of application No. 16/733,728, filed on Jan. 3, 2020, now Pat. No. 12,120,319.

(Continued)

(51) Int. Cl.
*H04N 19/172* (2014.01)
*H04N 19/66* (2014.01)
(Continued)

(52) U.S. Cl.
CPC .......... *H04N 19/172* (2014.11); *H04N 19/66* (2014.11); *H04N 19/70* (2014.11); *H04N 21/234* (2013.01);
(Continued)

(58) Field of Classification Search
None
See application file for complete search history.

(56) References Cited

U.S. PATENT DOCUMENTS 9,426,543 B1 8/2016 Li et al.
2009/0175349 A1 7/2009 Ye et al.
(Continued)

OTHER PUBLICATIONS

Iain E. Richardson, "The H.264 Advanced Video Compression Standard" (2d ed. 2010) pp. 117-134 (Year: 2010).
(Continued)

*Primary Examiner* — David N Werner
(74) *Attorney, Agent, or Firm* — BakerHostetler

(57) ABSTRACT

A media file may comprise a plurality of frames, each frame having a header that stores systems level information associated with the media file. A first portion of a frame that comprises the systems level information and a second portion of the frame that comprises the media content itself may be determined for one or more frames of the media file. A compressed header may be generated that comprises a subset of the systems level information associated with the media content of the frame. The compressed header may be generated by removing or compressing information that is determined to be redundant across the frames. The compressed header, as well as information for reconstructing the first frame based on the compressed header, may be sent to a device instead of the first portion of the frame, thereby reducing transmission bandwidth and storage requirements of the media file.

20 Claims, 7 Drawing Sheets

Related U.S. Application Data

(60) Provisional application No. 62/788,263, filed on Jan. 4, 2019.

(51) Int. Cl.

| | | |
|---|---|---|
| *H04N 19/70* | (2014.01) | |
| *H04N 21/234* | (2011.01) | |
| *H04N 21/235* | (2011.01) | |
| *H04N 21/236* | (2011.01) | |

(52) U.S. Cl.
CPC ... *H04N 21/2353* (2013.01); *H04N 21/23605* (2013.01)

(56) References Cited

U.S. PATENT DOCUMENTS

| | | | |
|---|---|---|---|
| 2013/0028271 A1 | 1/2013 | Limberg | |
| 2013/0293738 A1* | 11/2013 | Kulkarni | H04N 19/63 |
| | | | 348/222.1 |
| 2015/0281724 A1* | 10/2015 | Li | H04L 12/4633 |
| | | | 375/240.26 |
| 2016/0337673 A1 | 11/2016 | Agthe et al. | |
| 2016/0373790 A1* | 12/2016 | Tsukagoshi | H04N 21/6379 |
| 2017/0064313 A1* | 3/2017 | Wu | H04N 19/70 |
| 2017/0142452 A1* | 5/2017 | Bae | H04N 19/507 |
| 2017/0180824 A1 | 6/2017 | Casey et al. | |
| 2017/0332104 A1* | 11/2017 | Wendel | H04N 21/8358 |
| 2018/0124439 A1 | 5/2018 | Hwang et al. | |
| 2018/0359499 A1* | 12/2018 | Mavlankar | H04N 21/4384 |
| 2018/0376223 A1* | 12/2018 | Chen | H04N 21/234 |
| 2019/0110050 A1* | 4/2019 | Tsai | H04N 19/18 |
| 2019/0222623 A1 | 7/2019 | Huang | |
| 2020/0195946 A1 | 6/2020 | Choi et al. | |
| 2020/0336770 A1* | 10/2020 | Tsukagoshi | H04N 21/2343 |
| 2020/0374541 A1 | 11/2020 | Gao et al. | |

OTHER PUBLICATIONS

US Patent Application filed on Jan. 3, 2020, entitled "Overhead Reduction In Media Storage And Transmission", U.S. Appl. No. 16/733,728.

V. Sze, M. Budagavi, & G.J. Sullivan, High Efficiency Video Coding (HEVC): Algorithms and Architectures 29-30 (2014) (Year: 2014).

* cited by examiner

100

602

Receive a frame associated with a media file

604

Determine a first portion of the frame and a second portion of the frame

606

Access a database

608

Determine one or more playback characteristics of the frame

600

OVERHEAD REDUCTION IN MEDIA STORAGE AND TRANSMISSION

CROSS REFERENCE TO RELATED APPLICATIONS

This application is a continuation of U.S. patent application Ser. No. 16/733,728, filed Jan. 3, 2020, now U.S. Pat. No. 12,120,319, issued Oct. 15, 2024, which claims the benefit of U.S. Provisional Application No. 62/788,263, filed on Jan. 4, 2019, which are hereby incorporated by reference in their entirety.

BACKGROUND

A media file may comprise a plurality of frames, each frame having a header that stores systems level information associated with the corresponding frame of the media file. The systems level information within the media file may be essential for playback but may also be highly redundant. In MPEG media files, a program association table and a program mapping table may be frequently repeated and may be nearly identical throughout the numerous frames of the media file. Similarly, repeated video parameter set, sequence parameter set, and picture parameter set information may be identical or nearly identical for the plurality of frames of the media file. Thus, it may be desirable to provide methods for the efficient lossless compression of the systems level information to reduce the transmission bandwidth and storage requirements of the media files without affecting media quality.

SUMMARY

A media file may comprise a plurality of frames, each of the frames of the media file corresponding to a portion of media content associated with the media file. One or more frames of the media file may comprise systems level information that describes the media content of the media file. A first portion of a frame that comprises systems level information associated with the media content and a second portion of the frame that comprises the media content itself may be determined for one or more frames of the media file. The systems level information of the first portion of the frame may be highly redundant across the plurality of frames. A compressed header may be generated that comprises a subset of the systems level information associated with the media content of the frame. The compressed header may be generated by removing or compressing the redundant information across the one or more frames. The compressed header, as well as information for reconstructing the first frame based on the compressed header, may be sent to a device instead of the first portion of the frame, thereby reducing transmission bandwidth and storage requirements of the media file.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Systems level information in a MPEG media file may include packet headers, adaptation fields, packetized elementary stream (PES) headers, non-video coding layer (non-VCL) network abstraction layer (NAL) units, slice headers, etc. The systems level information within the media file may be essential for playback but may also be highly redundant. A program association table (PAT) and a program mapping table (PMT) may be frequently repeated and may be identical throughout numerous frames of the media file. Similarly, repeated video parameter set (VPS), sequence parameter set (SPS) and picture parameter set (PPS) information may be identical for the duration of the media file. Systems level information overhead may be less than ten percent in some cases but may increase significantly as segments become shorter (e.g., 100-250 ms fragments needed for low-latency linear streaming). Thus, it may be desirable to compress the systems level information in the media file in order to reduce transmission bandwidth and storage requirements.

Figure 1:
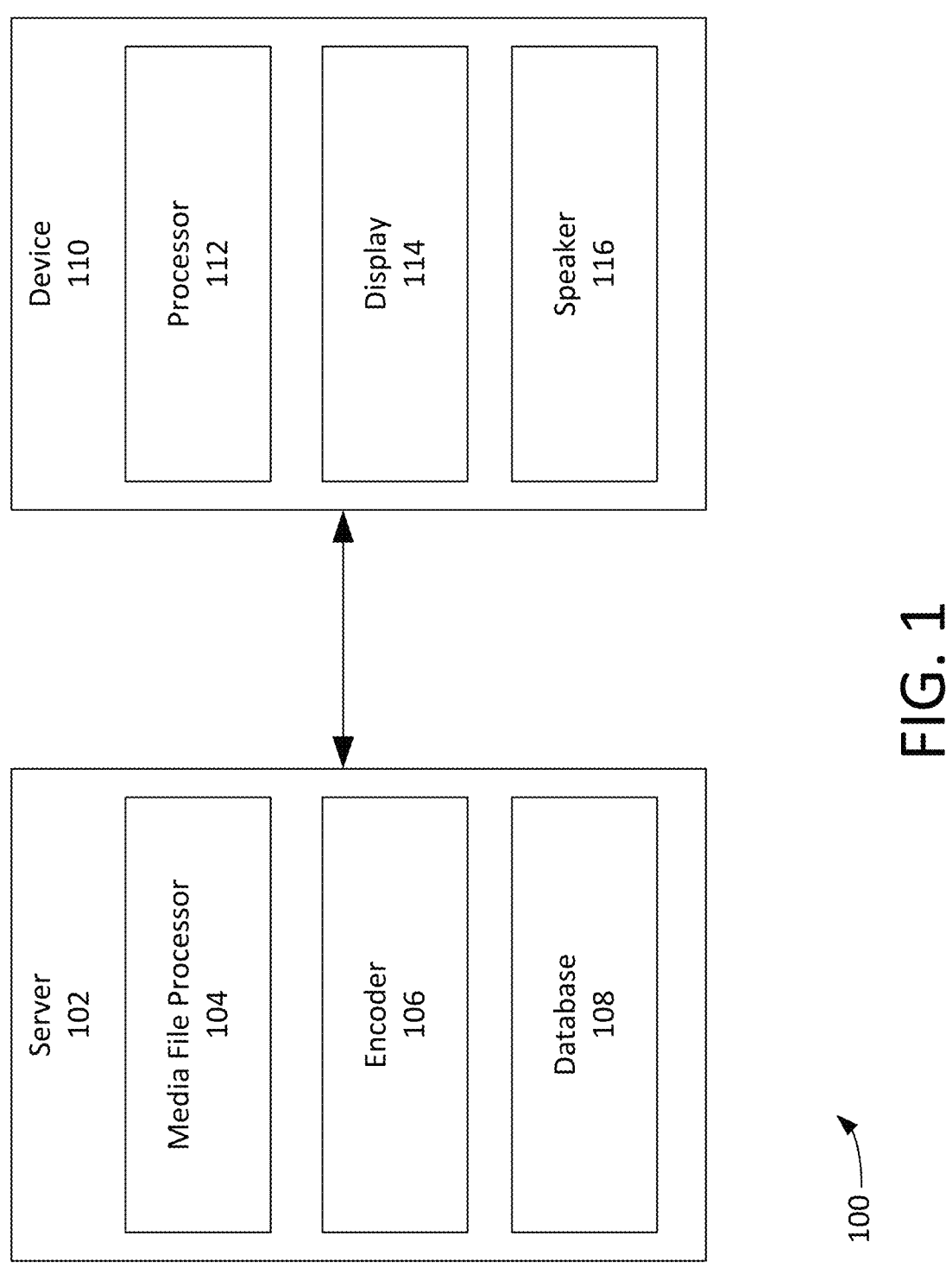
FIG. 1 is a block diagram of an example system.

Disclosed herein are methods and systems for compressing systems level information in a media file. FIG. 1 shows an example system 100 in accordance with an aspect of the disclosure. The system 100 may comprise a server 102 and a device 110. The server 102 may be configured to compress the systems level information in a media file by generating a compressed header and to send the compressed header to the device 110. The server 102 may comprise a media file processor 104, an encoder 106, and a database 108. The device 110 may be configured to receive the compressed header and to cause playback of the media file based on the compressed header and information stored in the database 108. The device 110 may comprise a processor 112, a display 114 and a speaker 116.

The media file processor 104 may be configured to process a media file. A media file may comprise any type of media (e.g., media content) that is capable of being played by a device, such as a television show, a movie, a streaming media file, etc., or any portion thereof. The media file may comprise one or more frames. Each frame of the media file may correspond to a fragment of the media file, such as a two second fragment of the media file or a ten second fragment of the media file. One or more of the frames may comprise information associated with the media content contained within that frame. For example, a frame may comprise a header that includes information such as a frame rate, a size of the frame, a bit depth of the frame, and a resolution of the frame. The frame may additionally or alternatively comprise color space information, HDR information, closed captions, and a sample rate, audio channel number, and layout associated with the audio data of the media file. In an MPEG example, a frame may additionally or alternatively comprise PID numbers and information such as a codec name, a profile, and a level (e.g., a H.264 Main profile, level 3.1). In an H.264/H.265 example, the header may additionally or alternatively include SPS/PPS information such as information on quantizers, bit width of fields, etc.

The media file processor 104 may be configured to split the media file into one or more portions. The media file processor 104 may be configured to determine a first portion of the frame that comprises the systems level information associated with the media content of that frame and a second portion of the frame that comprises the media content itself. The first portion of the frame (e.g., the systems substream) may comprise information such as MPEG packet headers, PES headers, ISO base media file format (ISO-BMFF) boxes other than 'mdat,' as well as complete H.264/H.265 non-VCL NAL units and NAL and slice headers for the VCL NAL units. The second portion of the frame (e.g., the media substream) may comprise the remainder of the VCL NAL units. The media file processor 104 may additionally or alternatively be configured to normalize the systems substream information, as described further herein.

The encoder 106 may be configured to encode the media file or a portion of the media file. Particularly, the encoder 106 may be configured to perform one or more compression operations on the systems portion of one or more frames of the media file. The systems portion of a frame of the media file may correspond to the first portion of the frame of the media file, such as a header associated with the frame of the media file. The encoder 106 may be configured to compress the systems portion of a frame of the media file based on redundancies in the systems portion of that frame and the systems portion of one or more other frames of the media file. The encoder 106 may determine that the headers of respective frames of the media file contain information that is similar across the plurality of frames of the media file, such as similar a frame rate, a similar frame size, a similar frame bit depth, and/or a similar frame resolution. The encoder 106 may be configured to remove or compress the redundant information in order to reduce the size of the frame. This may allow for easier storage and more efficient transmission of the media file. The encoder 106 may be configured to generate a compressed header that is similar to the systems portion of the frame minus the redundant information.

The database 108 may store information associated with the media file. The database 108 may receive information from the encoder 106 including information associated with the compressed header. The database 108 may include information for reconstructing the frame of the media file based on the compressed header and the second portion of the frame. Information associated with the database 108 may be sent to the device 110 or may otherwise be accessed by the device 110 so that the device 110 may reconstruct the media file for playback. It is understood that while FIG. 1 shows the database 108 as being part of the server 102, the database 108 may be located externally to the server 102.

The processor 112 of the device 110 may be configured to prepare one or more frames of a media file for playback. The processor 112 may receive the second portion of a frame. The second portion of the frame may comprise the content to be played back by the device 110. The processor 112 may additionally or alternatively receive or access the compressed header and the information stored in the database 108. The information stored in the database 108 may include information for reconfiguring the first portion of the frame based on the compressed header. Using the compressed header, the information stored in the database 108, and the second portion of the frame, the processor 112 may be configured to reconstruct the frame of the media file for playback by the device 102.

The display 114 may be configured to display one or more frames of the media file. The display 114 may receive one or more reconfigured frames of the media file from the processor 112. The display 114 may include any device capable of displaying video or image content to a user, such as a tablet, a computer monitor, or a television screen. The display 114 may be part of the device 110 such as in the example that the device 110 is a tablet or a computer. The display 114 may be separate from the device 110 such as in an example that the device 110 is a set top box and the display 114 is a television screen in electrical communication with the set top box.

The speaker 116 may be configured to output audio associated with the media file. The speaker may receive audio data from the processor 112. The speaker 116 may be any device capable of outputting audio associated with the media file. The speaker 116 may be part of the device 110 such as in the example that the device 110 is a tablet or a computer. The speaker 116 may be separate from the device 110 such as in an example that the device 110 is a set top box and the speaker 116 is a television or other external speaker in electrical communication with the set top box.

Figure 2:
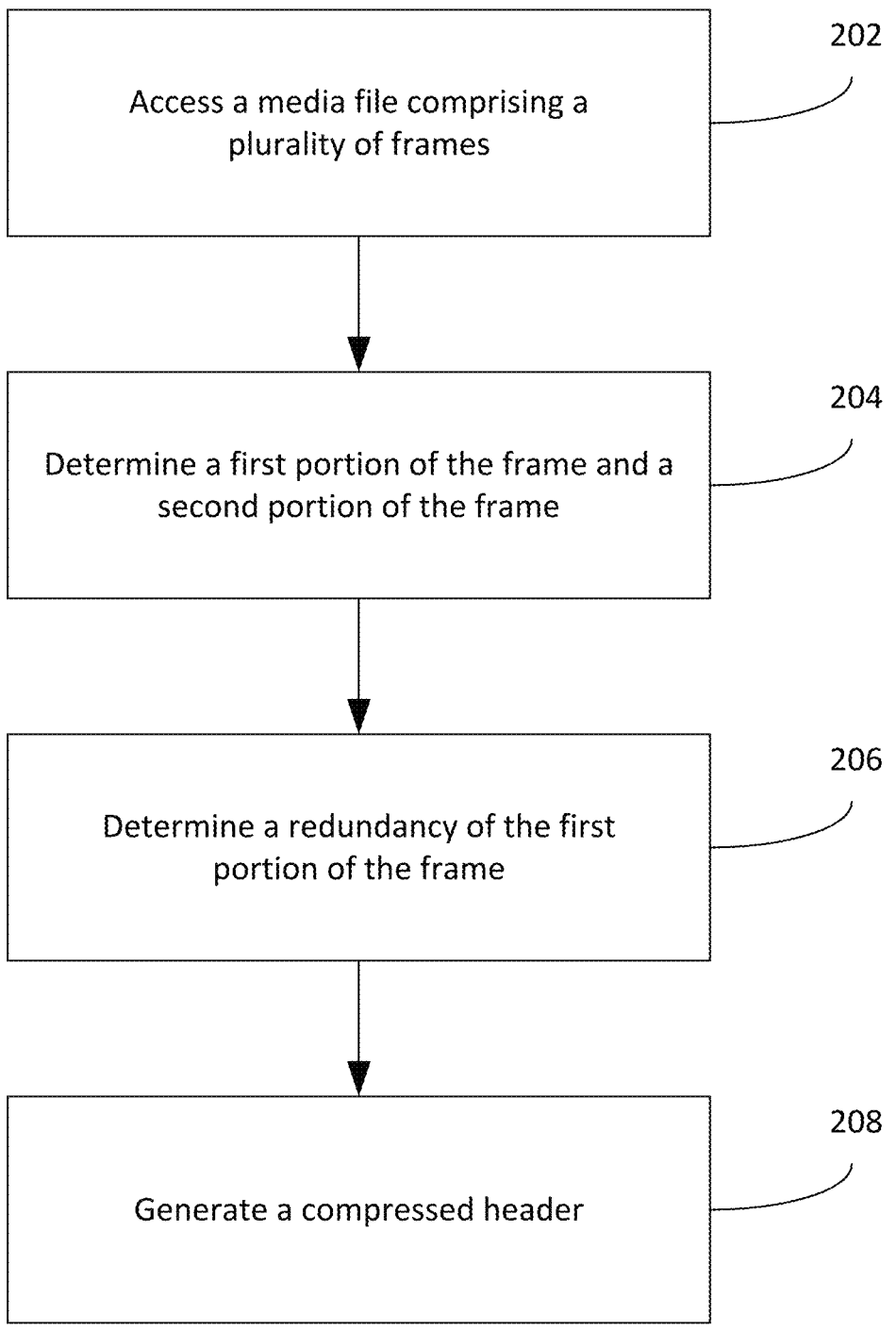
FIG. 2 is a flow chart of an example method.

FIG. 2 shows a flow chart of an example method 200. At step 202, a media file comprising a plurality of frames may be accessed. The media file may be accessed by a server, such as the server 102 shown in FIG. 1. The media file may comprise any type of media capable of being played by a device, such as a television show, a movie, a streaming media file, etc., or any portion thereof. The media file may comprise a plurality of frames. Each frame of the media file may correspond to a fragment of the media file, such as a two second fragment of the media file or a ten second fragment of the media file.

At step 204, a first portion of a frame that comprises systems level information associated with the media content may be determined for a frame of the media file. A second portion of the frame that comprises media content may also be determined for a frame of the media file. A first portion of a frame and a second portion of a frame may be determined for a plurality of the frames of the media file. In one example, the first portion of a frame may comprise information such as MPEG packet headers, PES headers, ISO base media file format (ISO-BMFF) boxes other than 'mdat,' as well as complete H.264/H.265 non-VCL NAL units and NAL and slice headers for the VCL NAL units. The second portion of the frame may comprise the remainder of the VCL NAL units, such as the CABAC-coded part of the VCL NAL units.

At step 206, a redundancy between the first portion of a frame of the plurality of frames and the first portion of at least one other frame of the plurality of frames may be determined. The first portion of the frame may comprise a header associated with the media file. The header associated with the media file may comprise an indication of one or more of a frame rate, a size of the frame, a bit depth of the frame, and a resolution of the frame. It may be determined that a portion of the information contained in the header is redundant throughout the headers of the plurality of frames of the media file. For example, a majority of the frames of the media file may comprise a similar frame rate, a similar frame size, a similar frame bit depth, and a similar frame resolution. Redundancies between frames may be determined using a basic difference comparison (e.g., compare A to B by subtracting B from A on a field-by-field basis).

In determining a redundancy between the first portion of a frame and the first portion of at least one other frame, it may be determined that the frame headers generally describe the same thing (e.g., the carriage of H.264 at a given resolution/bitrate/profile/level) and may be nearly identical.

Information that is determined to be redundant throughout the plurality of first portions of the frames (e.g., headers) may be stored in a database.

At step 208, a compressed header may be generated. The compressed header may be generated based on the determined redundancy between the first portion of the frame and the first portion of the at least one other frame. Generating the compressed header for a given frame may comprise comparing the first portion (e.g., header) of the frame with the information stored in the database using an XOR operation, and performing a run length encoding (RLE) operation on the result of the XOR operation. The compressed header may comprise a subset of the systems level information associated with the frame. The compressed header may be represented by a basic dictionary (e.g., key-value) compression scheme. A set sequence of bits may be replaced with a unique key that is shorter than the initial sequence that can then be looked up (e.g., in the database) and replaced on decompression to obtain the original sequence.

The database may comprise, for one or more of the plurality of frames of the media file, information for reconstructing a frame based on the compressed header associated with that frame and the second portion of the frame. Information associated with one or more of the frame rate, the size of the frame, the bit depth of the frame, and the resolution of the frame may be stored in the database. The information may be omitted from the compressed header. The information may be represented as a compressed version of the information in the compressed header. The compressed header may have a different format than the first portion of the frame of the media file. For example, the first portion of the frame may be encoded (e.g., RLE encoded) and/or compressed (e.g., using LZ77/LZMA compression) in order to determine the compressed header.

The device may require one or more security credentials for accessing the information stored in the database. The one or more security credentials may comprise a key or a passcode such as a personal identification number (PIN). The device, upon receipt of the compressed header, may send a request for the information stored in the database along with the security credentials. If the security credentials are determined to be valid, the information stored in the database for reconstructing the frame may be sent to the device.

Generating the compressed header may comprise encoding, based on the redundancy between the first portion of the frame and the first portion of the at least one other frame, at least a portion of the systems level information of the first portion of the frame. The compressed header and the information stored in the database may be sent to a device, such as the device 110 shown in FIG. 1. The device may be configured to reconstruct the frame of the media file based on the compressed header, the information stored in the database, and the second portion of the frame. In one example, the frame may be reconstructed by parsing the compressed header and following the commands contained in the database (e.g., execute setref and set the reference symbol, then reconstruct the XOR'ed string and perform an XOR operation to get back to the original header).

The information associated with the database may be sent to the device prior to the compressed header. The information associated with the database may be sent to the device prior to the compressed header and the second portion of the frame. In an example that the media file comprises a plurality of frames, the information associated with the database may be sent to the device prior to the compressed header and the second portion of the frame for each of the plurality of frames of the media file.

Figure 3:
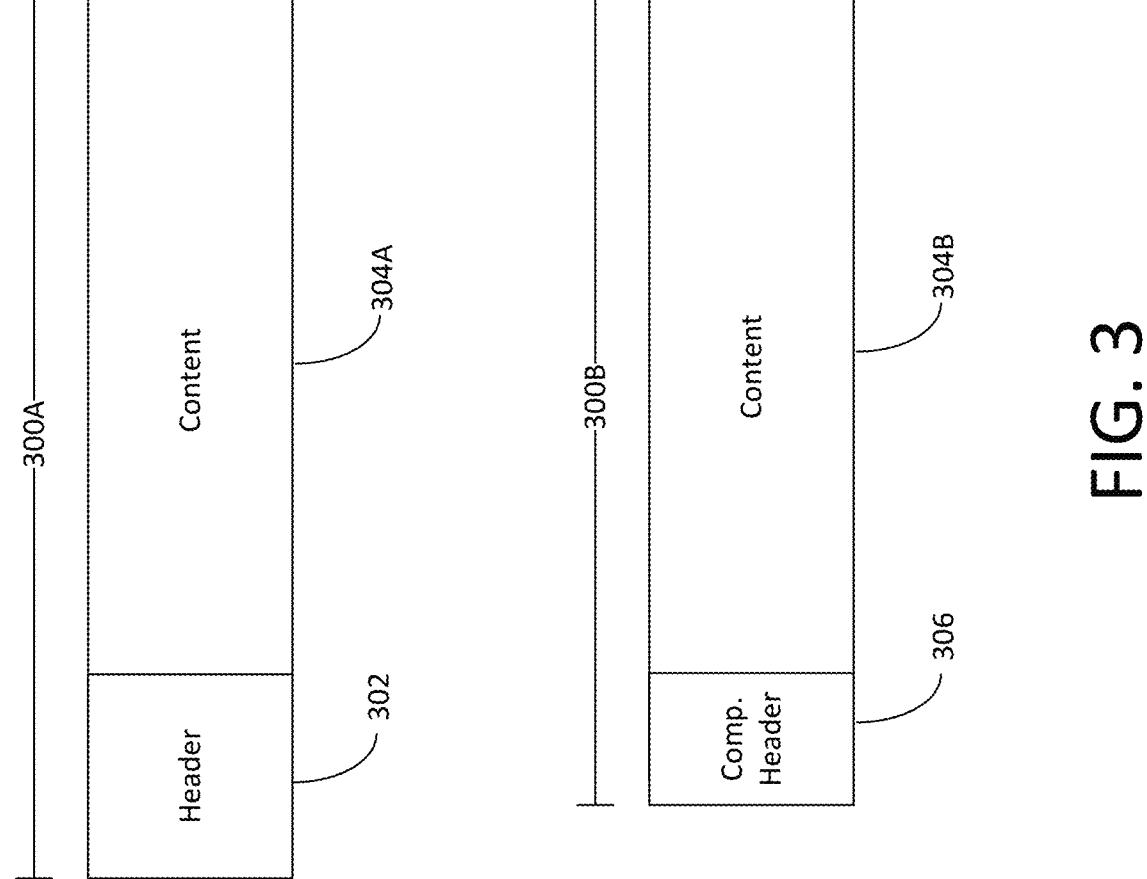
FIG. 3 shows an example frame of a media file.

FIG. 3 shows example frames 300A and 300B of a media file. The frames 300A and 300B may correspond to a fragment of the media file, such as a two second fragment of the media file or a ten second fragment of the media file. The frames 300A and 300B may correspond to the same fragment of the media file. Frame 300A may represent a frame 300 prior to the redundancy analysis and compression techniques discussed herein. Frame 300A may comprise a first portion 302 and a second portion 304A. The first portion 300A may comprise systems level information associated with media content of the frame 300A of the media file. The first portion 302 may be a header. The second portion 304A may comprise the media content associated with the frame 300A of the media file.

Frame 300B may represent the frame 300 after the redundancy analysis and compression techniques discussed herein have been applied to the frame. Frame 300B may comprise a compressed header portion 306 and a second portion 304B. The compressed header 306 may correspond to the first portion 302 of frame 300A after the redundant information has been removed from the first portion 302 and/or compression techniques have been applied to the first portion 302. The second portion 304B of frame 300B may be similar or identical to the second portion 304A of frame 300A. A device such as a playback device may be configured to receive the compressed header 306, the second portion 304B, and information associated with reconstructing the first portion 302 of the frame. The device may be configured to reconstruct the first portion 302 of the frame based on the compressed header 306 and the information for reconstructing the first portion 302 of the frame. The device may be configured to cause playback of the frame based on the compressed header 306, the information for reconstructing the first portion 302 of the frame, and the second portion of the frame 304B.

Figure 4:
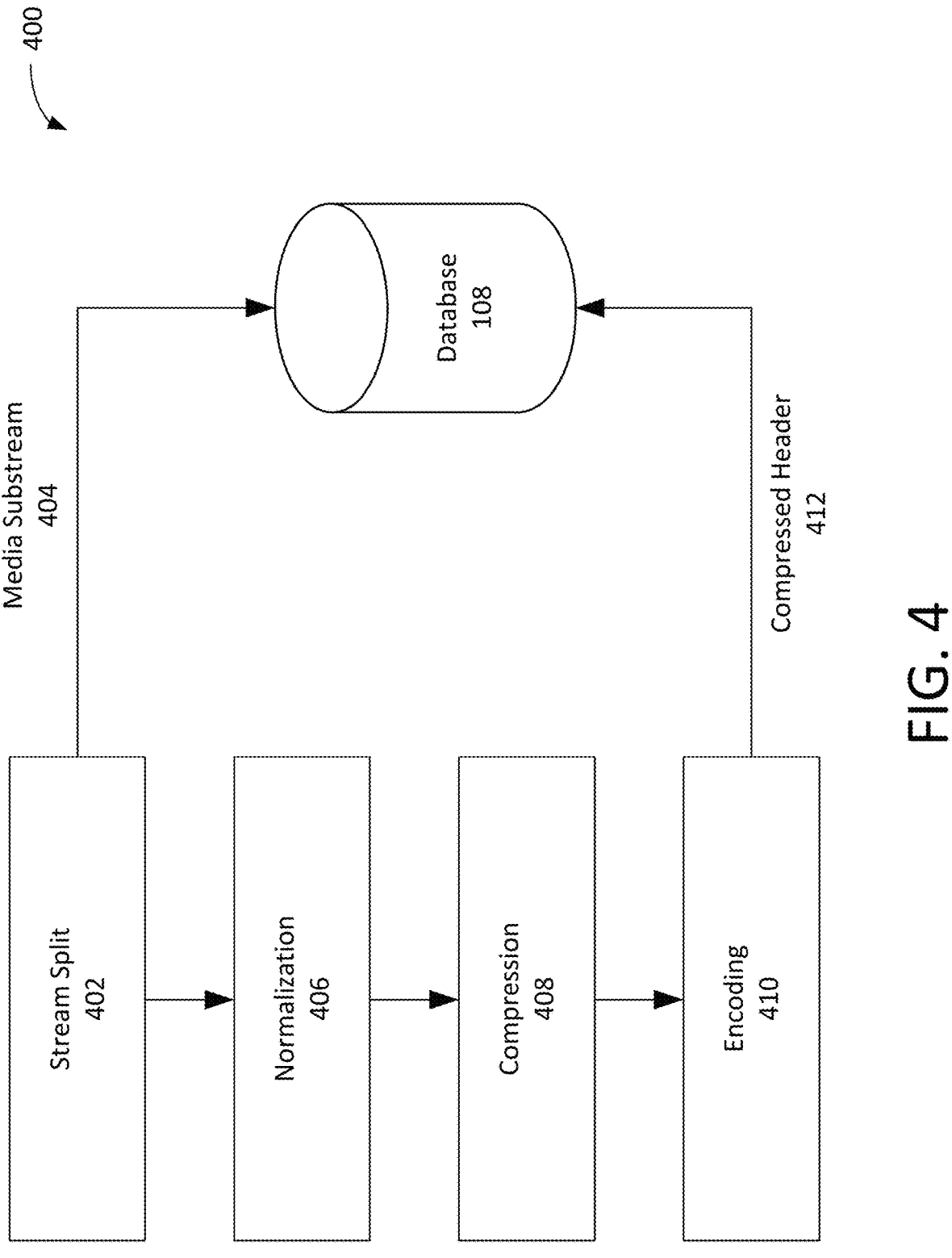
FIG. 4 is a flow chart of an example method.

FIG. 4 shows a flow chart of an example method 400 in accordance with an aspect of the disclosure. At step 402, one or more frames of a media file may be split into a systems substream (e.g., a first portion of the frame) and a media substream (e.g., a second portion of a frame). The systems substream may comprise information associated with media content of the frame, such as MPEG packet headers, PES headers, ISO base media file format (ISO-BMFF) boxes other than 'mdat,' as well as complete H.264/H.265 non-VCL NAL units and NAL and slice headers for the VCL NAL units. The media substream may comprise content associated with the media file, such as the remainder of the VCL NAL units. The media substream may be non-decodable. A database may be created which may contain byte offsets needed to reconstruct the media file out of the systems substream and the media substream.

The database may contain a list of byte sequences. The byte sequences may include (e.g., for ISO-BMFF) a complete segment start ('styp' to the last byte of 'mdat' header) as well as a CMAF chunk start ('moof' to last byte of 'mdat'). In the case of H.264 and H.265, these may be separate for both 'avc1' and 'avc3'/'hev1'/'hvc1' packaging and each frame type. They may additionally or alternatively be separate for different resolutions. For MPEG, the strings may include full MPEG packets for PAT/PMT/CAT/SCTE 35, as well as partial MPEG packets including the first packet of a PES (e.g., the sync byte until end of the slice header) for different frame types, a PCR-bearing packet, and a payload-only TS packet per each PID. The database may be constructed for expected content (e.g., the outputs of encoders used in a deployment at operating points used in that deployment) and may not need to accommodate all possible inputs. Each byte sequence in the database may have an identifier which may be its ordinal number within the sequence.

At step 404, the media substream may be stored in the database. The database may be the database 108 shown in FIG. 1. The media substream may comprise at least a portion of the content of the media file for playback by a device. However, the device may not be able to play back the content of the media file without the systems level information stored in the systems substream that has been separated from the media substream.

At step 406, normalization of the systems substream may be performed. Normalizing the systems substream may include the minimization of easily avoidable differences in the substream. It is understood that this step may be optional. As a part of this step, in the case of MPEG and for each PID, the continuity counter bits may be set to a constant value for each PID, the PES CRC (if present) may be set to zero, and the PIDs/descriptors may be normalized to a single set of values. Information on the normalization (e.g., the first continuity counter bit per PID and the PID remapping information) may be stored in the database.

At step 408, compression (e.g., delta compression) of the systems substream may be performed. The delta format may consist of the following instructions: setref, skip, insert, and diff. Each instruction may be expressed in an opcode, which may contain a number of bytes indicating the instruction and arguments. The delta-coded systems substream may consist of opcodes. The output of the delta compression step may be a differential bytestream.

The general theory of operation of the delta compressor is (a) finding the best reference sequence in the database, (b) applying XOR to current and reference strings, and (c) applying a run-length coding to the result of the XOR operation. However, it is understood that subtraction may additionally or alternatively be used as a difference operator (e.g., in place of XOR).

The setref instruction may set a reference string out of the database. The reference selection criterion may be a minimal amount of '1' bits in the XOR operation result. The setref may have two arguments: (a) a reference identifier and (b) a version indicator. The reference identifier is an identifier of a string in the database. The version identifier may identify whether the reference string is the database string or the last string of the bytestream predicted from that database. The reason for this may be that two adjacent headers of the same type carrying time stamps may have more common bits between themselves, increasing the amount of zeros in the XOR operation results. For example, the amount of common bits between two consecutive frame timestamp may be much smaller, as the timestamp is a 33-bit number incrementing in units of 4003 or 1501, for example.

Cursors within both the current and the reference string is a position from which the XOR operation starts.

The skip instruction may advance a cursor. Its arguments may be (a) the number of bits by which to advance the counter and (b) which of the cursors should be advanced.

The diff instruction encodes a portion of the XOR output using run-length encoding. The arguments include (a) a number of bits of the same value, (b) whether they are 0's or 1's, and (c) whether the operation should be repeated (e.g., if the reference is a 4-byte TS header, and there are 20 identical headers, all of them can be predicted from the same reference). Both cursors may be advanced.

The insert instruction inserts a binary-coded value. Its arguments may be (a) the number of bits, (b) whether the reference cursor should be advanced or stay the same, and (c) whether the operation should be repeated.

At step 410, generic lossless encoding may be performed on the differential bytestream. An algorithm such as LZMA or LZ77 may be used to generate a compressed header (e.g., a compressed differential bytestream (CDB)). The combination of the CDB and the media substream may be used in adaptive streaming by (a) transmitting the database at the beginning of the session and (b) sending media substream and CDB instead of the complete frame of the media file.

At step 412, the CDB may be stored in the database. The database may be carried in the initialization segment, may be a separate file referenced from the MPD, or may be inlined in the MPD. In one example, both the media substream and the CDB may be stored, and a separately stored database may be shared across different media assets.

Figure 5:
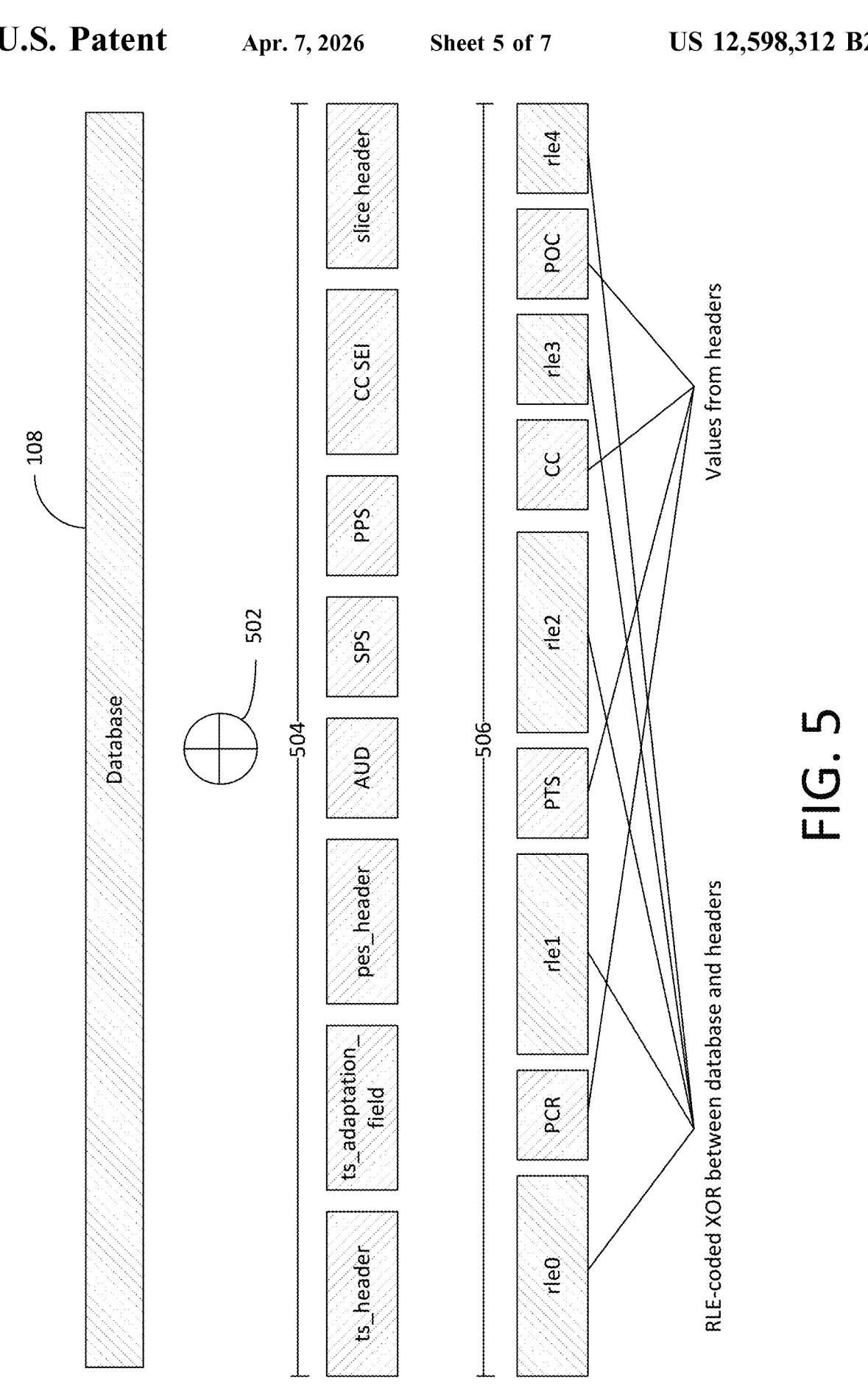
FIG. 5 shows an example header compression operation.

FIG. 5 shows an example compression operation in accordance with an aspect of the disclosure. An example header 504 (e.g., first portion) of a frame of a media file may comprise the following components: ts_header, ts_adaptation_field, pes_header, AUD, SPS, PPS, CC SEI, and slice header. The ts_header may be a transport stream header. The ts_adaptation_field may be a transport stream adaptation field. The pes_header may be a packetized elementary stream header. The SPS may be a sequence parameter set. The PPS may be a picture parameter set. The CC SEI may comprise closed captioning supplemental enhancement information. An XOR operation (502) may be performed between the header components and information stored in the database (e.g., a dictionary).

The database 108 shown in FIG. 5 may contain a list of byte sequences. The list of byte sequences may be generated based on information that is redundant across a plurality of headers of the media file, each of the headers corresponding to a particular frame of the media file. The byte sequences may include (e.g., for ISO-BMFF) a complete segment start ('styp' to the last byte of 'mdat' header) as well as a CMAF chunk start ('moof' to last byte of 'mdat'). In the case of H.264 and H.265, these may be separate for both 'avc1' and 'avc3'/'hev1'/'hvc1' packaging and each frame type. They may additionally or alternatively be separate for different resolutions. For MPEG, the strings may include full MPEG packets for PAT/PMT/CAT/SCTE 35, as well as partial MPEG packets including the first packet of a PES (e.g., the sync byte until end of the slice header) for different frame types, a PCR-bearing packet, and a payload-only TS packet per each PID. The database may be constructed for expected content (e.g., the outputs of encoders used in a deployment at operating points used in that deployment) and may not need to accommodate all possible inputs. Each byte sequence in the database may have an identifier which may be its ordinal number within the sequence.

The output of the XOR operation between the header components and the database information may result in a compressed header 506 with the following components: rle0, PCR, rle1, PTS, rle2, CC, rle3, POC, rle4. The output of the XOR operation may comprise many repetitions of the same character (e.g., many zero's) since the information in the database as compared with the header of a frame may be highly similar. A run length encoding (RLE) operation may be performed on the XOR result in order to generate the compressed header 506. This may be repeated for some or all of the plurality of frames of the media file. The rle0-rle4 components correspond to components of the header that have been compressed based on RLE operations. PCR may be a programm clock reference. PTS may be a presentation timestamp. CC may be closed captioning information. It is understood that a portion of the closed captioning information may be encoded and may be included in the run length encoding information. POC may be a picture order count.

While FIG. 5 shows that an encoding operation (e.g., a RLE operation) is performed on a result of an XOR operation between a database dictionary and a header of a particular frame, it is understood that an encoding operation may be performed on any of the header information in order to generate a compressed header. Data that has not been subject to an XOR operation, or data that was not altered by the XOR operation, may still be compressed (e.g., using an RLE operation) in order to reduce the data in the frame to generate the compressed frame.

Figure 6:
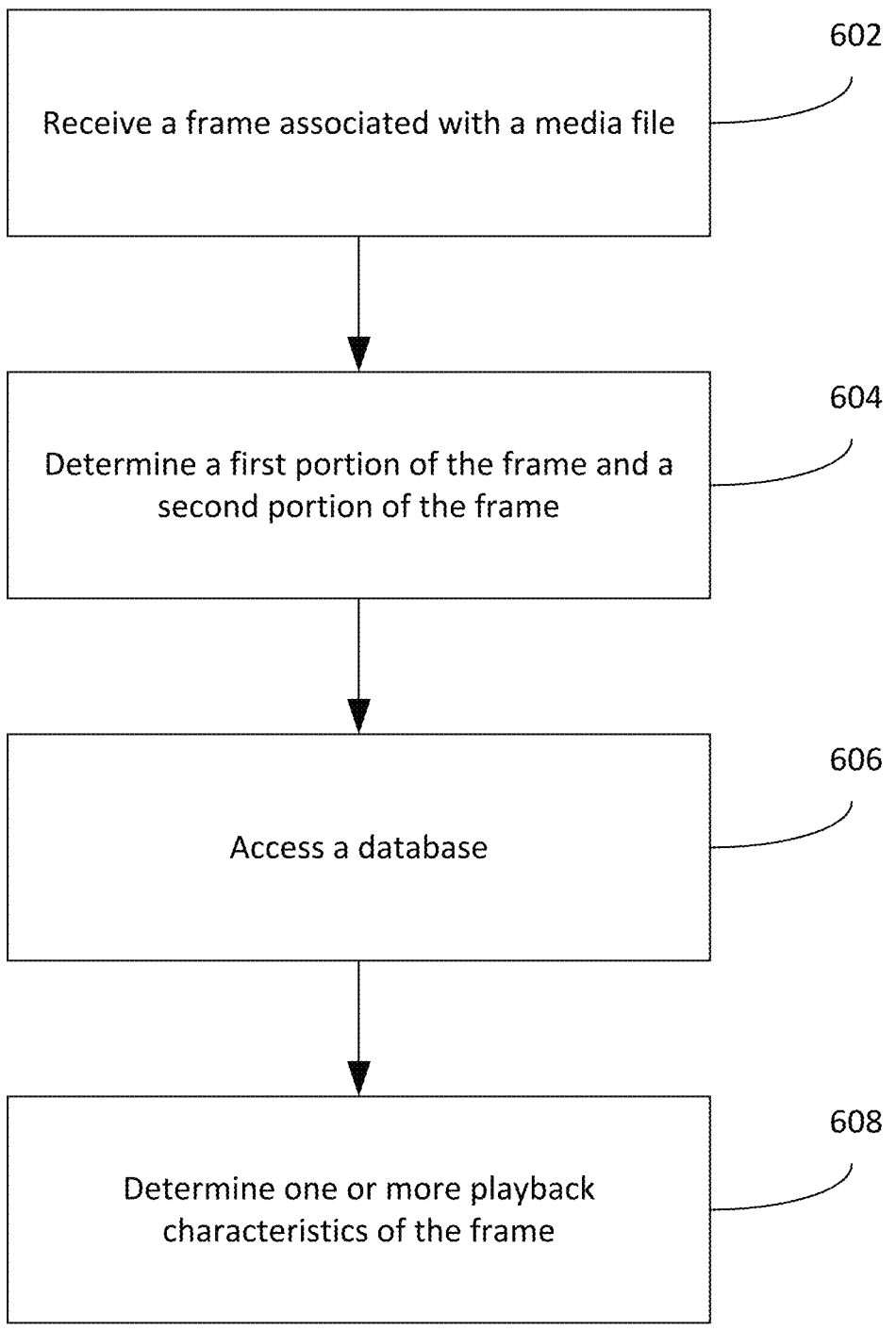
FIG. 6 is a flow chart of an example method.

FIG. 6 shows a flow chart of an example method 600. At step 602, a frame associated with a media file may be received. The frame associated with the media file may be received by a device, such as the device 110 shown in FIG. 1. The media file may comprise any type of media capable of being played by a device, such as a television show, a movie, a streaming media file, etc., or any portion thereof. The media file may comprise a plurality of frames. Each frame of the media file may correspond to a fragment of the media file, such as a two second fragment of the media file or a ten second fragment of the media file.

At step 604, a first portion of the frame that comprises a compressed header may be determined. A second portion of the frame that comprises media content may be determined. The compressed header may be associated with a header of the frame of the media file. The header associated with the frame of the media file may comprise an indication of one or more of a frame rate, a size of the frame, a bit depth of the frame, and a resolution of the frame. It may be determined by a server, such as the server 102 shown in FIG. 1, that a portion of the information contained in the header is redundant throughout the headers of the plurality of frames of the media file. For example, a majority of the frames of the media file may comprise a similar frame rate, a similar frame size, a similar frame bit depth, and a similar frame resolution.

The compressed header may have been generated based on the determined redundancy between the first portion of the frame and the first portion of the at least one other frame. The compressed header may comprise a subset of the systems level information associated with the media content of the frame. The compressed header may comprise a portion of information such as MPEG packet headers, PES headers, ISO base media file format (ISO-BMFF) boxes other than 'mdat,' as well as complete H.264/H.265 non-VCL NAL units and NAL and slice headers for the VCL NAL units. The second portion of the frame may comprise the remainder of the VCL NAL units. Generating the compressed header may comprise encoding, based on the redundancy between the first portion of the frame and the first portion of the at least one other frame, at least a portion of the systems level information of the first portion of the frame.

At step 606, a database associated with the media content may be accessed. The database may comprise information for reconstructing the media file based on the compressed header and the second portion of the frame. Information associated with one or more of the frame rate, the size of the frame, the bit depth of the frame, and the resolution of the frame may be stored in the database. The information may have been omitted from the compressed header. The information may be represented as a compressed version of the information in the compressed header.

At step 608, one or more playback characteristics of the frame may be determined. The one or more playback characteristics of the frame may be determined based on the compressed header and the database information. The device may be configured to reconstruct the frame of the media file based on the compressed header and the information stored in the database. The information associated with the database may be received at the device prior to the compressed header. The information associated with the database may be received at the device prior to a compressed header and a second portion of a frame for a plurality of the frames of the media file.

Figure 7:
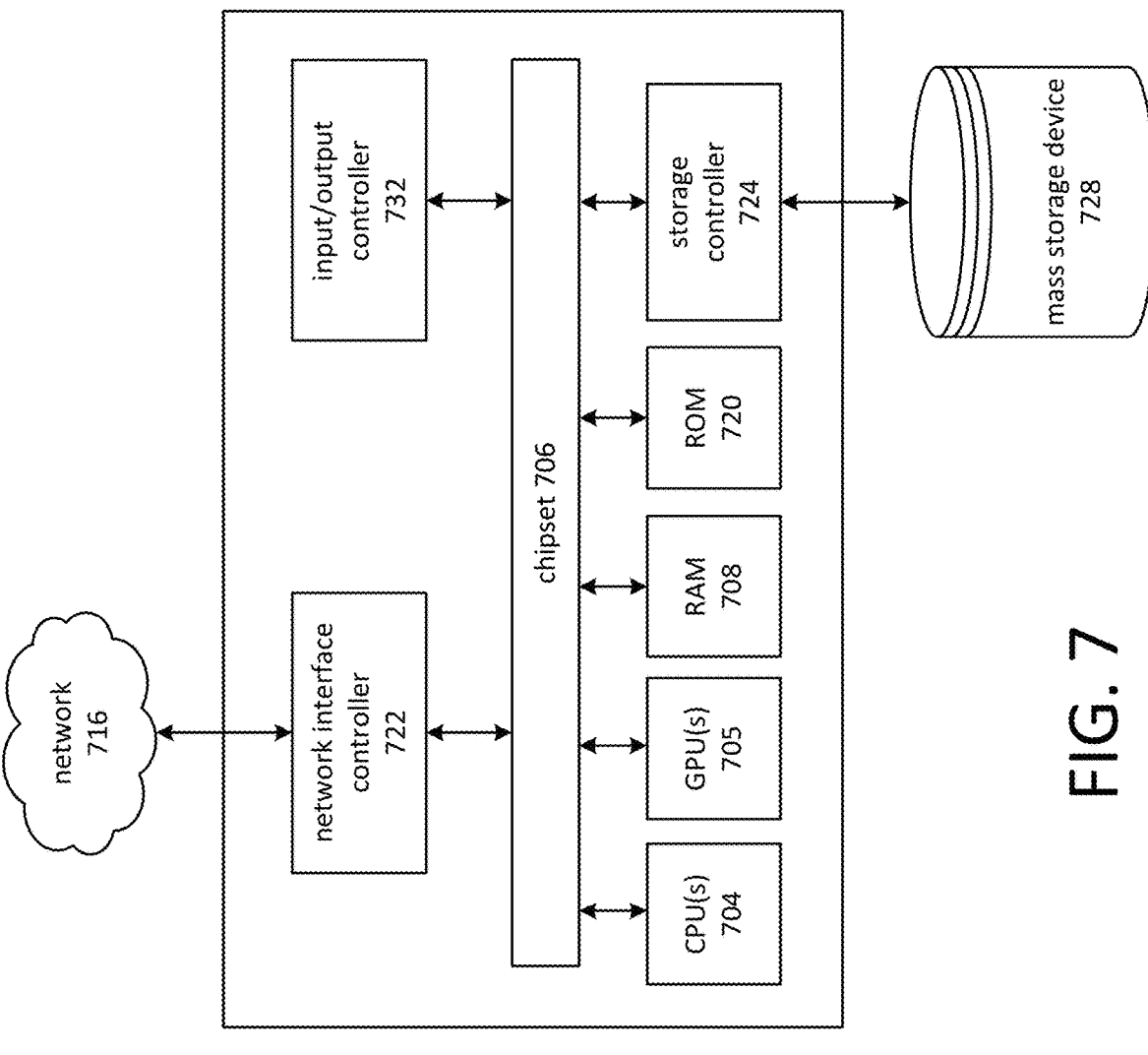
FIG. 7 is a block diagram of an example computing device.

FIG. 7 depicts a computing device that may be used in various aspects, such as the servers, modules, and/or devices depicted in FIG. 1. With regard to the example architecture of FIG. 1, the server 102, the media file processor 104, the encoder 106, the database 108, the device 110, the processor 112, the display 114, and/or the speaker 116 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2, 4 and 5.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A user interface may be provided between the CPU(s) 704 and the remainder of the components and devices on the baseboard. The interface may be used to access a random access memory (RAM) 708 used as the main memory in the computing device 700. The interface may be used to access a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein. The user interface may be provided by a one or more electrical components such as the chipset 706.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a storage device 728 that provides non-volatile storage for the computer. The storage device 728 may store system programs, application programs, other program modules, and data, which have been described in greater detail herein. The storage device 728 may be connected to the computing device 700 through a storage controller 724 connected to the chipset 706. The storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 728 is characterized as primary or secondary storage and the like.

For example, the computing device 700 may store information to the storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the storage device 728 by detecting the physical states or characteristics of one or more particular locations within the physical storage units.

In addition to the storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 728 may store other system or application programs and data utilized by the computing device 700.

The storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 2, 4 and 5.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:

determining, for a frame of a plurality of frames of content, a first portion of the frame that comprises a frame header and a second portion of the frame that comprises content;

determining a redundancy between the frame header of the frame and a frame header of at least one other frame of the plurality of frames; and generating, based on determining the redundancy between the frame header of the frame and the frame header of the at least one other frame, a compressed frame header, wherein the compressed frame header comprises a compression of the frame header of the frame.

2. The method of claim 1, wherein generating the compressed frame header comprises encoding, based on the redundancy between the frame header of the frame and the frame header of the at least one other frame, at least a portion of the frame header.

3. The method recited in claim 1, further comprising replacing, within the frame, the frame header of the frame with the compressed frame header.

4. The method of claim 1, wherein the frame header comprises an indication of one or more of a frame rate, a size of the frame, a bit depth of the frame, or a resolution of the frame.

5. The method of claim 1, further comprising generating information for reconstructing the frame based on the compressed frame header.

6. The method of claim 5, further comprising sending, to a device, the compressed frame header and the information for reconstructing the frame.

7. The method of claim 6, wherein the information for reconstructing the frame is sent to the device prior to the compressed frame header.

8. The method recited in claim 1, wherein the compression of the frame header comprises one or more of:

a run length encoding of at least a portion of the frame header;

a deletion of at least a portion of the frame header;

a replacement of at least a portion of the frame header with a unique key; or

a lossless-data compression of at least a portion of the frame header.

9. A method comprising:

receiving a frame of content;

determining that a first portion of the frame comprises a compressed frame header and a second portion of the frame comprises the content;

receiving information for reconstructing the first portion of the frame based on the compressed frame header; and reconstructing, based on the compressed frame header and the information, the first portion of the frame, wherein the compressed frame header is based on a redundancy between the reconstructed first portion of the frame and the first portion of at least one other frame of a plurality of frames of the content.

10. The method of claim 9, wherein the reconstructed first portion of the frame comprises an uncompressed header.

11. The method of claim 10, wherein the uncompressed header comprises an indication of one or more of a frame rate, a size of the frame, a bit depth of the frame, or a resolution of the frame.

12. The method of claim 9, further comprising receiving, prior to receiving the frame of the content, the information for reconstructing the first portion of the frame.

13. The method of claim 9, further comprising causing playback of the content based at least in part on the reconstructed first portion of the frame.

14. The method recited in claim 9, wherein the compressed frame header comprises one or more of:

a run length encoding of the reconstructed first portion of the frame;

a deletion of at least a portion of the reconstructed first portion of the frame;

a replacement of at least a portion of the reconstructed first portion of the frame with a unique key; or a lossless-data compression of at least a portion of the reconstructed first portion of the frame.

15. A method comprising:

determining that a first portion of a frame of content comprises a frame header and a second portion of the frame comprises the content;

generating a compressed frame header, wherein the compressed frame header comprises a compression of at least a portion of the frame header of the frame;

creating information for reconstructing the frame based on the compressed frame header and the second portion of the frame; and sending, to a device, the compressed frame header and at least an indication of the information for reconstructing the frame.

16. The method of claim 15, wherein generating the compressed frame header comprises encoding, based on a redundancy between the frame header of the frame and the frame header of at least one other frame, at least a portion of the frame header.

17. The method recited in claim 15, further comprising replacing, within the frame, the frame header of the frame with the compressed frame header.

18. The method of claim 15, wherein the frame header comprises an indication of one or more of a frame rate, a size of the frame, a bit depth of the frame, or a resolution of the frame.

19. The method of claim 15, wherein the information for reconstructing the frame is sent to the device prior to the compressed frame header.

20. The method recited in claim 15, wherein the compression of the at least the portion of the frame header comprises one or more of:

a run length encoding of the at least the portion of the frame header;

a deletion of at least a portion of the at least the portion of the frame header;

a replacement of at least a portion of the at least the portion of the frame header with a unique key; or a lossless-data compression of the at least the portion of the frame header.

* * * * *